US008801007B2

(12) United States Patent  (10) Patent No.: US 8,801,007 B2
Walther et al.  (45) Date of Patent: Aug. 12, 2014

(54) KNEE WALKER

(71) Applicant: Medline Industries, Inc., Mundelein, IL (US)

(72) Inventors: Linda M. Walther, Bristol, WI (US); Ethan S. Abernathey, Chicago, IL (US); Ishwor P. Adhikari, Mundelein, IL (US); John H. Kutsch, Harvard, IL (US); Vincent R. Lackowski, Glenview, IL (US)

(73) Assignee: Medline Industries, Inc., Mundelein, IL (US)

( * ) Notice: Subject to any disclaimer, the term of this patent is extended or adjusted under 35 U.S.C. 154(b) by 0 days.

(21) Appl. No.: 13/942,853

(22) Filed: Jul. 16, 2013

(65) Prior Publication Data
US 2013/0300080 A1 Nov. 14, 2013

Related U.S. Application Data

(62) Division of application No. 13/413,095, filed on Mar. 6, 2012, now Pat. No. 8,496,257, which is a division of application No. 12/860,318, filed on Aug. 20, 2010, now Pat. No. 8,231,133.

(51) Int. Cl.
*A63H 3/00* (2006.01)
(52) U.S. Cl.
USPC ............ 280/87.021; 482/66; 482/68; 135/67; 280/87.05
(58) Field of Classification Search
USPC ........... 280/87.041, 87.021, 87.05, 47.11, 30, 280/304.1, 657, 638, 400, 418, 426, 47.38
See application file for complete search history.

(56) References Cited

U.S. PATENT DOCUMENTS

| | | | |
|---|---|---|---|
| 1,288,588 | A | 12/1918 | Whiting |
| 1,328,343 | A | 1/1920 | Smith |
| 1,371,421 | A | 3/1921 | Hoffman |
| 1,457,842 | A | 6/1923 | Kashmere et al. |
| 1,611,307 | A | 12/1926 | Forse |
| 1,668,623 | A | 5/1928 | Avril |
| 2,222,678 | A | 11/1940 | Mittleburg et al. |
| 2,530,544 | A | 11/1950 | Schwantes |

(Continued)

FOREIGN PATENT DOCUMENTS

WO 2007/065174 6/2007

OTHER PUBLICATIONS

International Search Report corresponding to co-pending International Patent Application Serial No. PCT/US2011/047880, Korean Patent Office, dated Mar. 26, 2012; (5 pages).

(Continued)

*Primary Examiner* — John Walters
*Assistant Examiner* — James Triggs
(74) *Attorney, Agent, or Firm* — Nixon Peabody LLP

(57) ABSTRACT

Knee walker assemblies and methods of manufacturing a knee walker assembly are provided herein. One concept of the present disclosure is directed to a knee walker assembly that includes a frame, a support platform and a handle mounted to the frame, at least one rear wheel mounted proximate the rear end of the frame, and at least two front wheels swivel mounted proximate the front end of the frame. A locking mechanism is operatively engaged with the at least two front wheels. The locking mechanism is configured to substantially simultaneously lock both of the at least two front wheels in a rigid-type mounting configuration.

20 Claims, 3 Drawing Sheets

(56) References Cited

U.S. PATENT DOCUMENTS

| | | |
|---|---|---|
| 2,652,097 A | 9/1953 | Warren |
| 3,419,283 A | 12/1968 | Newland |
| 3,572,757 A | 3/1971 | Camps |
| 3,623,749 A | 11/1971 | Jensen |
| 3,890,668 A | 6/1975 | Stosberg et al. |
| 3,990,717 A | 11/1976 | Best |
| 3,992,024 A | 11/1976 | Workman |
| 4,029,329 A | 6/1977 | Chambers |
| 4,065,145 A | 12/1977 | Chambers |
| 4,202,561 A | 5/1980 | Yonkers |
| 4,239,248 A | 12/1980 | Ewers |
| 4,342,466 A | 8/1982 | Morgan |
| 4,621,804 A | 11/1986 | Mueller |
| 4,750,578 A | 6/1988 | Brandenfels |
| 4,830,133 A | 5/1989 | Gaddi |
| 4,844,494 A | 7/1989 | Blanchard |
| 4,867,188 A | 9/1989 | Reid |
| 4,907,794 A | 3/1990 | Rose |
| 4,917,396 A | 4/1990 | Meneses et al. |
| 4,930,796 A | 6/1990 | Harrod |
| 4,944,360 A | 7/1990 | Sturges |
| 5,158,313 A | 10/1992 | Becker |
| 5,167,597 A | 12/1992 | David |
| 5,388,659 A | 2/1995 | Pepe |
| 5,551,717 A | 9/1996 | De Courcey Milne |
| 5,600,857 A | 2/1997 | Heilmann |
| 5,702,326 A | 12/1997 | Renteria |
| 5,800,317 A | 9/1998 | Accetta |
| 5,816,593 A | 10/1998 | Che |
| 5,839,740 A | 11/1998 | Seeger |
| 6,053,189 A | 4/2000 | Longenecker et al. |
| 6,099,002 A | 8/2000 | Uchiyama |
| 6,149,170 A | 11/2000 | Dotson |
| 6,161,860 A | 12/2000 | Corneau |
| 6,311,708 B1 | 11/2001 | Howle |
| 6,343,802 B1 * | 2/2002 | Workman et al. ........ 280/87.041 |
| 6,481,730 B2 | 11/2002 | Sung |
| 6,520,525 B1 | 2/2003 | Yoon |
| 6,634,660 B2 | 10/2003 | Miller |
| 6,848,696 B2 | 2/2005 | Miller |
| 7,001,313 B1 | 2/2006 | Crnkovich |
| 7,780,180 B2 | 8/2010 | Hoepner et al. |
| 2001/0038186 A1 | 11/2001 | Wychozowycz |
| 2002/0130482 A1 | 9/2002 | Jang |
| 2004/0201192 A1 | 10/2004 | Ramm |
| 2005/0121873 A1 | 6/2005 | Miller |
| 2006/0033297 A1 | 2/2006 | Miller |
| 2007/0182116 A1 * | 8/2007 | Davey et al. ............... 280/87.05 |
| 2009/0058036 A1 | 3/2009 | Hoepner et al. |
| 2009/0058037 A1 | 3/2009 | Accetta |

OTHER PUBLICATIONS

International Written Opinion corresponding to co-pending International Patent Application Serial No. PCT/US2011/047880, Korean Patent Office, dated Mar. 26, 2012; (6 pages).

Medline: Mini 4 Parts List; Issue No. 1 dated Jan. 2005; 15 pages (30-44).

* cited by examiner

KNEE WALKER

CROSS-REFERENCE AND CLAIM OF PRIORITY

This application is a divisional of U.S. patent application Ser. No. 13/413,095, which was filed on Mar. 6, 2012, as a divisional of U.S. patent application Ser. No. 12/860,318, which was filed on Aug. 20, 2010, both of which are incorporated herein by reference in their respective entireties.

FIELD OF THE INVENTION

The present invention relates generally to ambulatory assistance devices for the physically impaired, and more particularly to multi-wheeled knee walker assemblies for aiding the disabled in walking.

BACKGROUND

Congenital, degenerative, and accidental damage to the human body can be debilitating, sometimes causing a person to lose their ability to walk without assistance. Various self-propelled carts, scooters, walkers, etc. have been designed to assist in the locomotion of a disabled person. The most well known example of these devices is the wheelchair, which typically comprises a seat that is connected to four support wheels by a rigid frame. Wheelchairs come in motorized and manually-powered variations, where the wheelchair is propelled by motors in the former instance or by the seated occupant turning the driving wheels by hand in the latter instance.

Another device for assisting in the locomotion of a disabled person is the knee walker. The knee walker is typically intended for users with an injury below the knee, such as an Achilles tendon injury, a fracture of the foot or ankle, or gout. The knee walker is designed to elevate and support a non-ambulatory leg, while allowing the user to utilize the ambulatory leg for propulsion. Most knee walkers include an elevated knee bench that is rigidly mounted on a support frame, both the support frame and the platform being maneuverable on casters or wheels. There are three general types of knee walkers: (1) knee walker assemblies that have rigidly mounted wheels and no steering capabilities, (2) knee walker assemblies that have rigidly mounted wheels and can be steered, and (3) knee walker assemblies with swivel-mounted wheels and no steering capabilities.

One known knee walker assembly includes a four-wheeled walking cart that is designed for supporting a person's leg and foot. The cart includes a frame, a leg support member coupled to the frame, and a handlebar coupled to the frame. The cart has two swivel-mounted front wheels and two rigidly-mounted rear wheels. The two rigidly-mounted rear wheels can be laterally shifted between first and second asymmetrical wheel positions relative to the frame, thereby accommodating a person having a non-ambulatory lower left leg or a non-ambulatory lower right leg, respectively.

Another known knee walker assembly includes a four-wheeled walking cart that is designed for supporting a person's leg and foot. The cart includes a frame, a leg support member coupled to the frame, and a handlebar movably coupled to the frame. The cart has two swivel-mounted front wheels and two rigidly-mounted rear wheels. The handlebar is moveable between first and second asymmetrical handlebar positions relative to the frame, thereby accommodating a person having a non-ambulatory lower left leg or a non-ambulatory lower right leg, respectively.

In yet another known configuration, a therapeutic scooter is provided. The scooter includes a tubular frame with four rigidly mounted wheels. The wheel assembly includes front and rear axles, each axle maintaining a pair of laterally offset wheels. A steering assembly is telescopingly coupled to the front axle. The steering assembly has a cross-bar with handles. The cross-bar is provided with a braking mechanism to slow and stop the scooter.

According to another known design, a steerable kneeling walker is presented that includes a frame, a steering assembly coupled to the frame, and a steering stem. The kneeling walker is movably supported on four rigidly mounted wheels. The control assembly is coupled to the steering stem to rotate the front wheels about separate pivot points.

There are various disadvantages and drawbacks to the currently available knee walker assemblies. For instance, knee walker designs where the wheels are 100% rigid will have limited maneuverability. If the knee walker does not have built-in steering capabilities, the entire knee walker assembly must be lifted and repositioned to turn. If the knee walker does have built-in steering capabilities, the turning radius may be too large for tight places such as airport shops, bathrooms, etc. In contrast, knee walker configurations where the wheels swivel 100% may be dangerous due to limited control of the assembly when the ambulatory leg is not in contact with the ground. The features of the present disclosure eliminate the drawbacks present in these designs.

BRIEF DESCRIPTION OF THE DRAWINGS

Various advantages of the invention will become apparent upon reading the following detailed description and upon reference to the drawings.

Figure 1:
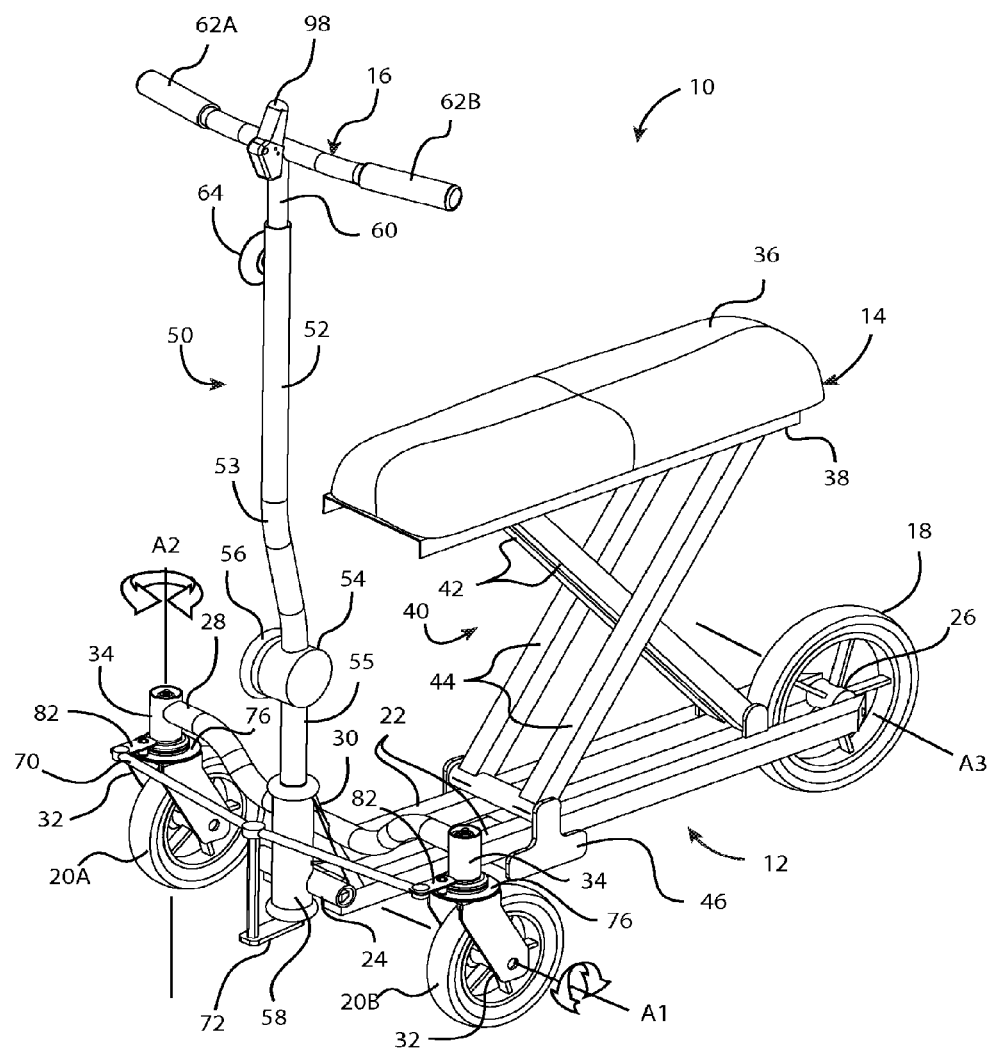
FIG. 1 is an isometric illustration of an exemplary knee walker assembly in accordance with embodiments of the present concepts.

While the invention is susceptible to various modifications and alternative forms, specific embodiments are shown by way of example in the drawings and will be described in detail herein. It should be understood, however, that the invention is not limited to the particular forms disclosed. Rather, the invention is to cover all modifications, equivalents, and alternatives falling within the spirit and scope of the invention.

DETAILED DESCRIPTION OF THE ILLUSTRATED EMBODIMENTS

While this invention is susceptible of embodiment in many different forms, there are shown in the drawings and will herein be described in detail representative embodiments of the invention with the understanding that the present disclosure is to be considered as an exemplification of the principles of the invention and is not intended to limit the broad aspect of the invention to the embodiments illustrated. To that extent, elements and limitations that are disclosed, for example, in the Figures, Abstract, and Detailed Description of the Illustrative Embodiments, but not explicitly set forth in the claims, should not be incorporated into the claims, singly or collectively, by implication, inference or otherwise.

Referring to the drawings, wherein like reference numbers refer to like components throughout the several views, FIG. 1 presents an isometric illustration of an exemplary knee walker assembly, designated generally as 10, in accordance with various aspects of the present disclosure. The drawings presented herein are not to scale, and are provided purely for explanatory purposes. Thus, the individual and relative dimensions and orientations shown in the drawings are not to be considered limiting. In addition, the use of spatial adjectives in the specification and claims, such as "front," "rear," "forward," "rearward," "upward," "downward," etc., are intended, unless explicitly indicated otherwise, to specify the comparative orientation of a given component relative to the knee walker assembly when operatively mounted thereto.

The knee walker assembly 10 is intended for, albeit not per se limited to, aiding a physically impaired person in walking In the illustrated embodiment, the knee walker assembly 10 includes a rigid frame, designated generally at 12, a support platform 14 that is mounted to the frame 12, a handle or handle bar 16, at least one rear wheel 18 mounted to the frame 12 proximate the rear end thereof, and at least two front wheels (e.g., right and left front wheels 20A and 20B, respectively) mounted to the frame 12 proximate the front end thereof. The frame 12 is desirably fabricated from a rigid material, which may include, but is not limited to, metals, such as aluminum and steel, polymers, such as polyvinyl chloride (PVC) and polyethylene terephthalate (PET), glass-fiber composites, etc. The frame 12 is shown in the drawings comprising a tubular structure with two generally horizontal, longitudinally oriented base beams 22 connected at the front with a laterally oriented cross-beam 24 and at the back with a laterally oriented wheel bearing 26. A front axle 28 extends transversely across the front of the frame 12, rigidly mounted to each of the base beams 22 via a respective upwardly extending coupling bracket 30 (only one of which is visible in the drawings, but a second coupling bracket is also present in the illustrated frame 12). Optional end plugs can be inserted into the open ends of the base beams 22, cross-beam 24, and/or other open tube ends for aesthetic and/or safety purposes.

Recognizably, the frame 12 may comprise fewer or greater than the various beams illustrated in FIG. 1. Moreover, the length, width, and height of frame 12 can be modified, for example, to accommodate the particular user and/or intended application of the knee walker assembly 10. It is likewise contemplated that one or more of the beams can be replaced with alternate structure, such as a base plate or box. To that end, the base beams 22 and cross-beam 24 are exemplified in the drawings as elongated, hollow tubes; alternatively, the beams 22, 24 may be fabricated as solid bars, and may take on alternative geometries.

With continuing reference to the exemplary embodiment of FIG. 1, each of the front wheels 20A, 20B is swivel mounted (i.e., attached in a swivel-type mounting configuration) to the front axle 28. As used herein, "swivel mount" and "swivel-type mounting configuration" is intended to indicate a mounting arrangement where the wheel can revolve around a rolling axis and rotate about a non-rolling axis. For example, each of the front wheels 20A, 20B is connected (e.g., via a wheel-pin or roller bearing) to a respective swivel fork 32 such that the wheel 20A, 20B can revolve around its central rolling axis A1. The swivel fork 32, in turn, is connected via a swivel joint 34 to the front axle 28. The swivel joint 34 allows the swivel fork 32 to rotate about a non-rolling axis A2 that is laterally offset from the center of the front axle 28 and passes through a diametric plane of the wheel 20A, 20B. In other words, the front wheels 20A, 20B, when in a swivel-type mounting configuration, can roll around axis A1 and swivel about axis A2, which is generally perpendicular to axis A1. When in motion along a straight line, the swivel mounted wheels 20A, 20B will tend to automatically align with, and rotate parallel to the direction of travel.

In contrast to the front wheels 20A, 20B, the rear wheel 18 is shown attached in a rigid-type mounting configuration to the rear of the frame 12. As used herein, "rigid mount" and "rigid-type mounting configuration," when referring to a wheel, is intended to indicate a mounting arrangement where the wheel can rotate relative to the wheel mount, but the wheel mount cannot rotate relative to the frame. For example, the rear wheel 18 is rotatably mounted, e.g., via wheel bearing 26, to the longitudinally oriented base beams 22 such that the wheel 18 can revolve around its central rolling axis A3. Unlike the front wheels 20A, 20B, however, the rear wheel 18 cannot swivel on the roller bearing 26 around a non-rolling axis. In some embodiments, such as that illustrated in FIG. 1, the knee walker assembly 10 has a single rear wheel 18 that is longitudinally spaced from and centrally aligned with the front wheels 20A, 20B.

The support platform 14 is configured to support at least one human appendage. In the illustrated embodiment, for example, the support platform 14 is designed to prop up and hold a user's non-ambulatory lower leg during operation of the knee walker assembly 10. In the illustrated embodiment, for example, the support platform 14 of FIG. 1 includes a cushion 36 fixed to the upper surface of a planar substrate 38. The cushion 36 may comprise, for example, a molded plastic body or a foam core that is covered with vinyl or any other suitable material.

According to one aspect of the present disclosure, the support platform 14 is vertically adjustable (i.e., may be raised or lowered) relative to the frame 12. In one exemplary configuration, the support platform 14 is mounted on a collapsible stanchion arrangement, designated generally at 40 in FIG. 1. The collapsible stanchion arrangement 40 includes a pair of pivoting stanchions 42 that are pivotably attached at respective first ends to the substrate 38 and pivotably attached at respective second ends to the base beams 22 of the frame 12. The collapsible stanchion arrangement 40 also includes a pair of sliding stanchions 44 that are pivotably attached at respective first ends to the substrate 38 and pivotably attached at respective second ends to a movable trolley 46. The trolley 46 is slidably mounted to the base beams 22 for rectilinear travel between the front and rear ends of the frame 12. The trolley 46 is configured to adjust the vertical height of the support platform 14. In particular, sliding the trolley 46 forward on the frame 12 (i.e., to the left in FIG. 1) causes the pivoting stanchions 42 and sliding stanchions 44 to collapse onto each other in a scissor-like fashion, thereby drawing the support platform 14 down towards the base beams 22. Sliding the trolley 46 in the opposite direction towards the rear end of the frame 12 (i.e., to the right in FIG. 1), in contrast, will draw the first and second ends of the pivoting stanchions 42 together with the first and second ends of the sliding stanchions 44, respectively, thereby raising the support platform 14. Alternate arrangements for raising and lowering the support platform 14 are also envisioned, such as a telescoping support-column arrangement or a pneumatic air cylinder arrangement.

Figure 2:
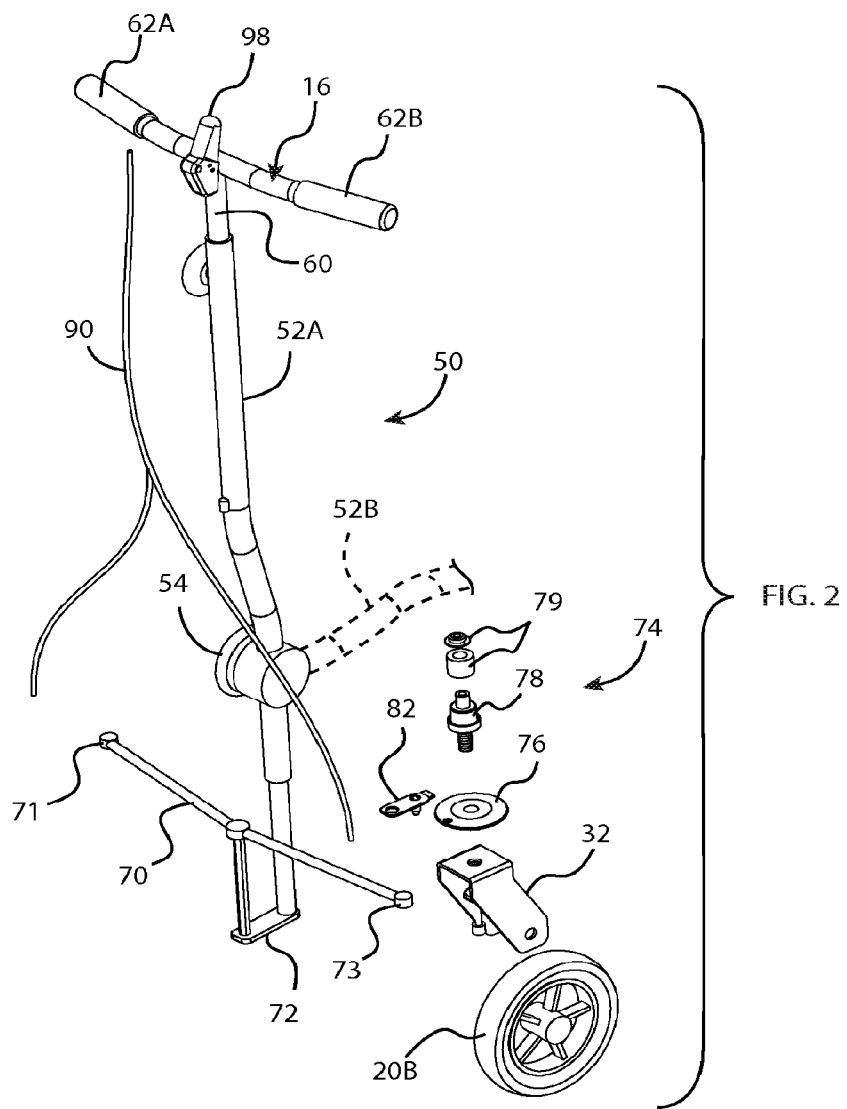
FIG. 2 is a partially exploded perspective-view illustration of a portion of the knee walker assembly of FIG. 1.

The knee walker assembly 10, in some embodiments, is also provided with a steering mechanism, designated generally as 50, that is configured to selectively reposition the front wheels 20A, 20B such that the knee walker assembly 10 can be maneuvered by the user. The steering mechanism 50 shown in FIGS. 1 and 2 comprises a steering column 52 that is attached at a first end to the frame 12 and at a second end to the handle bar 16. The steering column 52 passes through a hollow sleeve 58, which is coupled to the front axle 28 and the base beams 22 at the front end of the frame 12. As best seen in FIG. 2, a connector plate 72 attaches a T-shaped tie rod 70 to the lower end of the steering column 52 such that the tie rod 70 rotates with the steering column 52 via manipulation of the handle bar 16. Each lateral end 71, 73 (FIG. 2) of the tie rod 70 selectively engages with a respective one of the front wheels 20A, 20B, as described below. When so engaged, the tie rod 70 turns the front wheels 20A, 20B in response to the rotation of the handle bar 16 and, thus, the steering column 52.

The steering column 52, in some embodiments, may be selectively repositionable between an upright position, exemplified at 52A in FIG. 2, and a collapsed position, exemplified schematically with hidden lines at 52B in FIG. 2. For example, the steering mechanism 50 may be provided with a locking hub 54 that is configured to retain the steering column 52 in a plurality of positions relative to the frame 12, including the upright position 52A, the collapsed position 52B, and one or more positions therebetween. In this instance, the steering column 52 is separated into two segments, with an upper segment 53 of the steering column 52 fixedly attached to an outer cuff of the locking hub 54, and a lower segment 55 of the steering column 52 fixedly attached to an inner cuff of the locking hub 54. Rotation of a tension dial 56 (e.g., in a counterclockwise direction) will loosen the locking hub 54, allowing the user to reorient the upper segment 53 of the steering column 52 relative to the lower segment 55 thereof. Once oriented in the desired position, rotation of the tension dial 56 in an opposite direction (e.g., clockwise) will mechanically lock the upper and lower segments 53, 55 of the steering column 52 in the selected orientation.

In another embodiment, the handle bar 16 includes right and left handle grips 62A and 62B, respectively, attached at opposing ends of the upper transverse section of a T-shaped handle mount 60. The handle bar 16 may be adjustable, for example, to accommodate users of differing heights and/or for increased compactness during storage of the knee walker assembly 10. According to one exemplary configuration, the handle mount 60 of FIG. 1 is designed to telescope with respect to the steering column 52. For example, the downwardly extending section of the T-shaped handle mount 60 is slidably received through an opening in a hollow portion of the upper segment 53 of the steering column 52. A locking screw 64 is provided, which is repositionable to allow a user to adjust the position of the handle mount 60 relative to the steering column 52. For instance, rotation of the locking screw 64 (e.g., in a counterclockwise direction) will release the handle mount 60, allowing for longitudinal translation thereof into and out of the steering column 52. Once oriented in the desired position, rotation of the locking screw 64 in an opposite direction (e.g., clockwise) will mechanically retain the handle mount 60 in the selected orientation. Any of a wide variety of alternative coupling mechanisms may readily be employed as a substitute for the locking screw 64 (e.g., a quick-connect locking device or a spring-biased locking pin). In addition, alternative handle arrangements, wheels, or other steering configurations may be used on alternate embodiments. Moreover, the knee walker assembly 10 may be provided with an optional braking mechanism (not shown) that is operable to slow and/or stop the knee walker assembly 10.

Both of the front wheels 20A, 20B of the knee walker assembly 10 are configured to selectively switch between a swivel-type mounting configuration and a rigid-type mounting configuration. The knee walker assembly 10 of FIGS. 1-3, in some embodiments, includes a variable mounting assembly, designated generally as 74 in FIG. 2, for mounting the front wheels proximate the front end of the frame 12. The variable mounting assembly 74 is designed to simultaneously or nearly simultaneously transition both of the front wheels 20A, 20B from a swivel-type mounting configuration to a rigid-type mounting configuration, and back. In some embodiments, the knee walker assembly 10 includes a locking mechanism that selectively engages the front wheels 20A, 20B to simultaneously or substantially simultaneously lock both of the front wheels 20A, 20B in a rigid-type mounting configuration. This provides the knee walker assembly 10 with all of the advantages of having swivel-mounted front wheels (e.g., increased maneuverability), while eliminating the disadvantages to a knee walker assembly with only swivel mounted front wheels (e.g., limited control).

Figure 3:
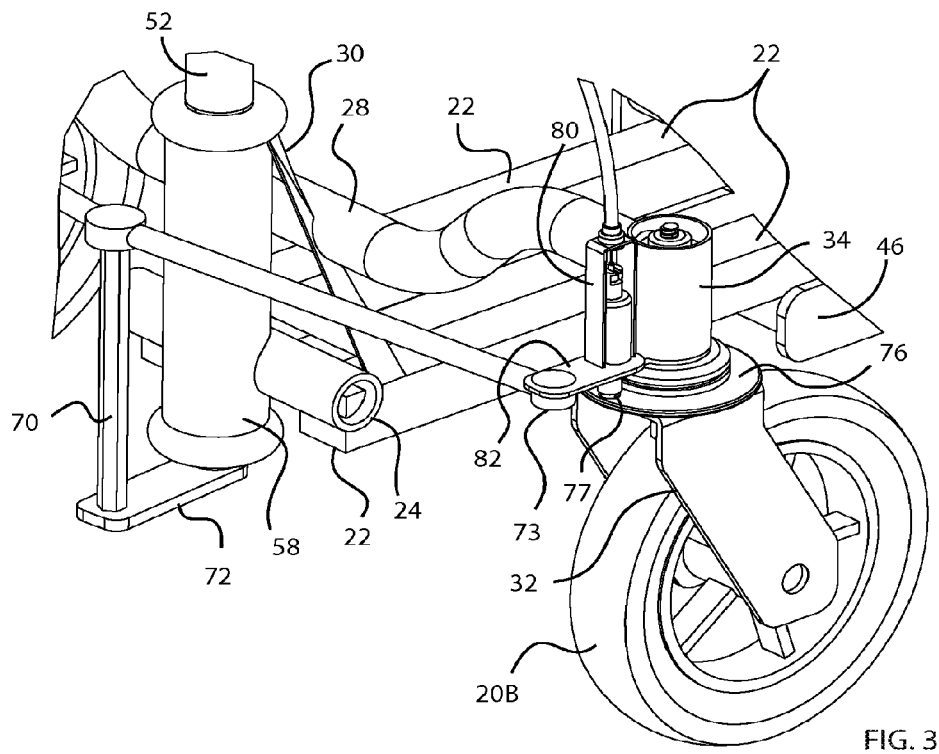
FIG. 3 is an enlarged perspective-view illustration of another portion of the knee walker assembly of FIG. 1.

As described above, the front wheels 20A, 20B are swivel mounted to the frame 12 by swivel forks 32 and swivel joint 34. A locking disc 76, which is most readily visible in FIGS. 2 and 3, is rigidly fastened to the top of each swivel fork 32, for example, via a compression bushing 78 and a bushing and nut combination 79, both of which are part of the swivel joint 34. Each locking disc 76 includes an aperture 77 (readily visible in FIG. 2, but only labeled in FIG. 3) that is shaped and sized to receive a locking pin 86 (FIG. 4) to thereby lock the respective front wheel 20A, 20B in the rigid-type mounting configuration.

Figure 4:
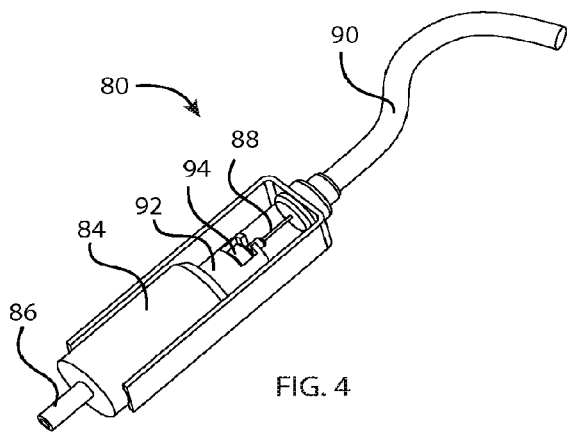
FIG. 4 is an enlarged perspective-view illustration of an exemplary locking-pin mechanism that may be used with the knee walker assembly of FIG. 1.

The knee walker assembly 10 also includes a pair of retractable locking pin assemblies 80, illustrated in FIGS. 3 and 4, each of which is mounted onto a steering tab 82 at a respective lateral end 71, 73 of the tie rod 70. Each locking pin assembly 80 is configured to selectively engage a respective one of the front wheels 20A, 20B—namely, the corresponding locking disc 76, to thereby lock the front wheel 20A, 20B in a rigid-type mounting configuration. In particular, as seen in FIGS. 3 and 4, each retractable locking pin assembly 80 comprises a generally hollow, cylindrical housing 84 that is attached (e.g., via fasteners or welding) to one of the steering tabs 82. A locking pin 86 is slidably mounted at least partially within the housing 84. A biasing member, such as a compression spring (not visible in the views provided) is disposed within the housing 84. The biasing member urges the locking pin 80 into an extended position whereat a distal end of the locking pin 86 extends out of the housing 84 (as seen in FIG. 4) into the aperture 77 of the locking disc 76 (as seen in FIG. 3). When the locking pin 86 is properly seated inside the aperture 77, the swivel joint 34 is rendered inoperable and the fork 32 is restricted from rotating about the non-rolling axis A2. As such, each wheel 20A, 20B can rotate relative to the swivel fork 32 around its respective central rolling axis A1, but the fork 32 cannot rotate (i.e., "swivel") relative to the front axle 28—i.e., the wheel is in a "rigid-type mounting configuration."

A retractor cable 88 is routed through a sheath 90 and attached at a proximal end 92 of the locking pin 86 via a cable connector 94. The retractor cable 88 is configured to selectively draw the locking pin 86 out of engagement with the locking disc 76, thereby releasing the front wheels 20A, 20B for rotation about the swivel joint 34. In the illustrated embodiment, for example, an activating lever 98, which is shown in FIGS. 1 and 2, is attached to the handle bar 16 (e.g., at a midsection of the handle mount 60 between the right and left handle grips 62A and 62B). The activating lever 98 is configured to selectively disengage both retractable locking pin assemblies 80 from the locking discs 76. In particular, drawing the activating lever 98 backwards (e.g., to the right in FIG. 1) will apply a tensile force to the retractor cable 88, which in turn will transmit the tensile force to the proximal end 92 of the pins 86 via the cable connectors 94. When the tensile force on the pins 86 overcomes the biasing member, the pins 86 will translate longitudinally in a generally rectilinear motion into the housing 84 and out of engagement with the locking discs 76. In so doing, the swivel joints 34 are operable such that the swivel forks 32 can rotate about the non-rolling axes A2. As such, each wheel 20A, 20B can rotate relative to the fork 32 around its respective central rolling axis A1, and each fork 32 can rotate relative to the front axle 28 around its respective non-rolling axis A2—i.e., each wheel is in a "swivel-type mounting configuration."

In some embodiments, when the front wheels 20A, 20B are in the swivel-type mounting configuration, the steering mechanism 50 is rendered inoperable, for example, because the tie rod 70 is disengaged from the wheels 20A, 20B. In an alternative configuration, the knee walker assembly can include a steering locking mechanism that is operable to lock or otherwise secure the steering mechanism 50 in place. One exemplary design includes a steering locking pin that is operatively mounted, e.g., by a U-shaped mounting bracket, to the frame 12. An actuator cable is attached at one end thereof to the activating lever 98, and at another end thereof to a proximal end of the steering locking pin. When the lever 98 is activated (e.g., drawn backwards) by the user, both retractable locking pin assemblies 80 are disengaged from the locking discs 76, as described above. In addition, a distal end of the steering locking pin is engaged with the tie rod 70—e.g., received via a complementary cavity or hole in a portion of the tie rod 70, when the lever 98 is activated. For example, the steering locking pin can be movably mounted to the U-shaped mounting bracket by a pivot plate. In this instance, the locking pin is attached at a first lateral end of the pivot plate and the actuator cable is attached at an opposing second lateral end of the pivot plate. The pivot plate is pivotably mounted to the U-shaped bracket (e.g., via a hinge or pin) to rotate about its center. The first lateral end of the pivot plate can be urged upwards by a biasing member (e.g., a compression spring) such that the steering locking pin is biased out of engagement with the tie rod 70. However, when the lever 98 is activated, a tensile force is applied to the actuator cable, which is transferred to the second lateral end of the pivot plate. This tensile force, in turn, will rotate the pivot plate about its central axis, pushing the first lateral end down against the biasing member, thereby feeding the steering locking pin into the hole in the tie rod 70. In so doing, the tie rod 70 is rigidly locked to the frame 12. The steering column 52 is thus rigidly locked to the frame 12 via the connector plate 72 that attaches the T-shaped tie rod 70 to the lower end of the steering column 52. As such, the steering mechanism 50 cannot be repositioned (or turned) by the user.

In some embodiments, when the front wheels 20A, 20B are released by the retractable locking pin assemblies 80, they are operable to pivot less than approximately 360 degrees about the non-rolling axis A2. In some embodiments, when the front wheels 20A, 20B are released by the retractable locking pin assemblies 80, they are operable to pivot less than approximately 160 degrees about the non-rolling axis A2. The pivot range of the front wheels 20A, 20B may be limited by integrating stops or other appropriate structure into the knee walker assembly 10. Alternatively, when the front wheels 20A, 20B are released by the retractable locking pin assemblies 80, they are operable to freely pivot about the non-rolling axis A2.

According to another aspect of the present disclosure, an improved method of manufacturing a knee walker assembly is presented. In some embodiments, the method includes: mounting a support platform to a rigid frame, the support platform being configured to support at least one human appendage; mounting a handle to the frame; mounting at least one rear wheel proximate a rear end of the frame; mounting at least two front wheels proximate a front end of the frame such that the front wheels can transition between a swivel-type mounting configuration and rigid-type mounting configuration; attaching a locking mechanism to the frame, the locking mechanism being configured to substantially simultaneously lock both of the at least two front wheels in the rigid-type mounting configuration.

In some embodiments, the method of manufacturing a knee walker assembly includes at least those steps identified in the preceding paragraph. It is also within the scope and spirit of the present invention to omit steps, include additional steps, and/or modify the order presented above. For example, in some embodiments, the method also includes mounting a steering mechanism to the frame, the steering mechanism being configured to selectively reposition the at least two front wheels. It should be further noted that the method represents a single sequence of manufacturing a knee walker assembly. However, it is expected that the method be practiced systematically to manufacture numerous knee walker assemblies. Although the method is described herein with respect to the structure illustrated in FIGS. 1-4, the claimed methods of the present disclosure are not limited to these exemplary embodiments.

While the best modes for carrying out the present invention have been described in detail, those familiar with the art to which this invention relates will recognize various alternative designs and embodiments for practicing the invention within the scope of the appended claims.

What is claimed is:

1. A knee walker assembly comprising:
   a frame with opposing front and rear ends;
   a support platform mounted to the frame;
   a handle mounted to the frame;
   a rear wheel mounted to the frame proximate the rear end thereof;
   a front wheel swivel mounted to the frame proximate the front end thereof such that the front wheel is operable to revolve around a rolling axis and rotate about a non-rolling axis;
   a locking disc mounted for common rotation with the front wheel about the non-rolling axis; and
   a retractable locking pin assembly mounted to the frame, the retractable locking pin assembly being configured to selectively engage the locking disc to thereby lock the front wheel such that the front wheel is restricted from rotating about the non-rolling axis without being restricted from revolving around the rolling axis.

2. The knee walker assembly of claim 1, wherein the retractable locking pin assembly comprises a housing mounted to the frame, and a locking pin disposed at least partially within the housing, the locking pin being movable between an extended position, whereat the locking pin engages the locking disc and thereby locks the front wheel, and a retracted position, whereat the locking pin disengages the locking disc and thereby unlocks the front wheel.

3. The knee walker assembly of claim 2, wherein the retractable locking pin assembly further comprises a biasing member urging the locking pin towards the extended position, and a retractor cable configured to draw the locking pin into the housing towards the retracted position.

4. The knee walker assembly of claim 3, wherein the locking disc includes an aperture within which is received the locking pin when the locking pin is in the extended position.

5. The knee walker assembly of claim 1, further comprising a second front wheel swivel mounted to the frame proximate the front end thereof such that the second front wheel is operable to revolve around a second rolling axis and rotate about a second non-rolling axis.

6. The knee walker assembly of claim 5, further comprising:
   a second locking disc mounted for common rotation with the second front wheel; and
   a second retractable locking pin assembly mounted to the frame, the second retractable locking pin assembly being configured to selectively engage the second locking disc to thereby lock the second front wheel such that the second front wheel is restricted from rotating about the second non-rolling axis without being restricted from revolving around the second rolling axis.

7. The knee walker assembly of claim 6, wherein each of the retractable locking pin assemblies comprises a respective housing, a respective locking pin slidably mounted at least partially within the housing, a respective biasing member urging the pin out of the housing, and a respective retractor cable configured to draw the pin into the housing.

8. The knee walker assembly of claim 6, further comprising a single activating mechanism the activation of which engages both of the locking pins with the respective locking discs.

9. The knee walker assembly of claim 6, further comprising a steering mechanism mounted to the frame and operatively engaged with the front wheels, the steering mechanism being operable to selectively reposition the front wheels only when the front wheels are locked.

10. The knee walker assembly of claim 1, further comprising a swivel fork swivel mounting the front wheel to the frame such that the swivel fork and the front wheel both rotate about the non-rolling axis.

11. The knee walker assembly of claim 10, wherein the locking disc is rigidly mounted to the swivel fork for common rotation therewith about the non-rolling axis.

12. The knee walker assembly of claim 1, wherein the front wheel, when unlocked by the retractable locking pin assembly, is restricted to rotating less than approximately 160 degrees about the non-rolling axis.

13. A knee walker assembly for aiding a physically impaired person in walking, the knee walker assembly comprising:
   a rigid frame with opposing front and rear ends;
   a support platform mounted to the rigid frame, the support platform being configured to support at least one human appendage;
   a rear wheel mounted proximate the rear end of the rigid frame;
   first and second front wheels each mounted via a respective swivel fork to the rigid frame proximate the front end thereof such that each of the front wheels is operable to revolve around a respective rolling axis and rotate about a respective non-rolling axis;
   first and second locking discs each rigidly mounted to a respective one of the swivel forks for common rotation with a respective one of the front wheels about the respective non-rolling axis; and
   first and second retractable locking pin assemblies mounted to the frame, each of the retractable locking pin assemblies being configured to selectively engage a respective one of the locking discs to thereby lock a respective one of the front wheels such that the front wheel is restricted from rotating about the respective non-rolling axis without being restricted from revolving around the respective rolling axis.

14. A method of manufacturing a knee walker assembly, the method comprising:
   mounting a support platform to a rigid frame, the support platform being configured to support at least one human appendage;
   mounting a rear wheel proximate a rear end of the frame;
   mounting two front wheels proximate a front end of the frame such that each of the front wheels is operable to revolve around a respective rolling axis and rotate about a respective non-rolling axis;
   mounting each of two locking discs for common rotation with a respective one of the front wheels about the respective non-rolling axis; and
   mounting two retractable locking pin assemblies to the frame, each of the retractable locking pin assemblies being configured to selectively engage a respective one of the locking discs to thereby lock a respective one of the front wheels such that the front wheel is restricted from rotating about the respective non-rolling axis without being restricted from revolving around the respective rolling axis.

15. The method of claim 14, wherein each of the retractable locking pin assemblies comprises a respective housing mounted to the frame, and a respective locking pin disposed at least partially within the housing, the locking pin being movable between an extended position, whereat the locking pin engages the locking disc and thereby locks the front wheel, and a retracted position, whereat the locking pin disengages the locking disc and thereby unlocks the front wheel.

16. The method of claim 15, wherein each of the retractable locking pin assemblies further comprises a respective biasing member urging the respective locking pin towards the extended position, and a respective retractor cable configured to draw the respective locking pin into the housing towards the retracted position.

17. The method of claim 14, further comprising mounting only a single activating mechanism to the frame, wherein activation of the single activating mechanism engages both of the locking pins with the respective locking discs.

18. The method of claim 14, further comprising mounting a steering mechanism with a handle to the frame, the steering mechanism being operable to selectively reposition the front wheels only when the front wheels are locked.

19. The method of claim 14, wherein the mounting the two front wheels includes mounting two swivel forks to the frame, each of the swivel forks being configured to rotate about a respective one of the non-rolling axes.

20. The method of claim 19, wherein the mounting the two locking discs includes rigidly mounting each of the locking discs to a respective one of the swivel forks.

* * * * *